United States Patent

Kadotani et al.

[11] Patent Number: 5,267,917
[45] Date of Patent: Dec. 7, 1993

[54] ROTARY ELEMENT ENGAGING DEVICE FOR AN AUTOMATIC TRANSMISSION

[75] Inventors: Masanori Kadotani; Masahiro Haybuchi, both of Anjo; Takashi Morimoto, Nishio; Kazumasa Tsukamoto, Toyota; Yasuo Hojo, Nagoya; Hidehiro Oba; Yutaka Taga, both of Aichi, all of Japan

[73] Assignees: Aisen Aw Co., Ltd.; Toyota Jidosha Kabushiki Kaisha, both of Japan

[21] Appl. No.: 964,634

[22] Filed: Oct. 23, 1992

[30] Foreign Application Priority Data

Oct. 29, 1991 [JP] Japan .................................. 3-308341

[51] Int. Cl.⁵ .................................................. F16H 57/10
[52] U.S. Cl. ...................................... 475/318; 475/317; 192/12 B; 192/48.92
[58] Field of Search ............. 475/317, 318; 192/12 B, 192/48.92

[56] References Cited

U.S. PATENT DOCUMENTS 3,831,464  8/1974  Zaiser .
4,800,782  1/1989  Sivalingam ..................... 475/318 X
4,913,270  4/1990  Ishido et al. .................. 192/48.92 X
5,186,693  2/1993  Nishida et al. ............... 192/48.92 X Primary Examiner—Leslie A. Braun
Assistant Examiner—Daniel Wittels
Attorney, Agent, or Firm—Lorusso & Loud

[57] ABSTRACT

A rotary element engaging device of an automatic transmission includes a stationary member, a planetary gear set having rotary elements, a frictionally engaging element interposed between the stationary member and one of the rotary elements, a one-way clutch interposed between the stationary member and the one rotary element, and an operating member for engaging and disengaging the frictionally engaging element. The rotary element is adapted to be selectively engaged with the stationary member through two paths formed of the frictionally engaging element and the one-way clutch. The one-way clutch is disposed between the frictionally engaging element and the operating member. The one-way clutch includes an inner race connected to the one rotary element and an outer race fixed to the stationary member. The operating member is adapted to act on the frictionally engaging element through the outer race.

6 Claims, 2 Drawing Sheets

ROTARY ELEMENT ENGAGING DEVICE FOR AN AUTOMATIC TRANSMISSION

BACKGROUND OF THE INVENTION

1. Field of the Invention

The present invention relates to an automatic transmission, and in particular, to a frictional engagement device for engaging and disengaging a rotary element of a planetary gear set to/from a stationary member.

2. Description of the Background Art

In some automatic transmissions, a rotary element (a sun gear, a carrier or a ring gear) of a planetary gear set is disposed to engage a stationary component, such as a casing, through two paths, e.g. a brake and a one-way clutch. In the prior art, the above disposition is achieved by structures, as disclosed in the U.S. Pat. Specification No. 3,831,464, in which the inner race of the one-way clutch is bolted to a brake cylinder, and the outer race is splined through a sleeve to the ring gear of the planetary gear set.

If the above arrangement is applied to a brake part for a reverse driving, this part must bear a large torque, so that the force for engaging or holding the brake must be increased. However, if the number of friction members constituting the brake is increased and/or the hydraulic pressure for operating the brake is increased for the above purpose, the increase in the number of friction members of the frictionally engaging element may result in an increase in the axial length of the transmission and torque loss due to drag in the disengaged state, and the increased hydraulic pressure may require substitution of stronger, i.e. heavier and larger, parts. Therefore, it is preferable to increase the pressure receiving area of an operating piston in order to increase the torque capacity of the brake without causing the above disadvantage.

In recent years, there is a tendency with automatic transmissions toward increase in the number of speed change ranges, reduction in size and lighter weight construction with a view toward enhancement of driving performance of the vehicle, comfort of ride, reduction of fuel consumption and other advantages. In order to satisfy two conflicting demands, i.e. increase in the number of speed change ranges, which increases the number of components of the automatic transmission, and reduction of the size and weight, improvements are required for minimizing the sizes of members in each part of the automatic transmission and for more closely arranging the members.

In the prior art, the inner race of is merely bolted to the brake cylinder, so that the inner race and the cylinder wall must have sufficient thicknesses for insertion of the bolts, which requires increase in radial size and conversely reduces the pressure receiving area of the piston.

Japanese Laid-Open Patent Publication No. 61-45148 discloses a construction for increasing the pressure receiving area of the piston. This construction employs two axially aligned brake pistons, which together form a force magnifier. Although this construction can avoid an increase in the radial size, the axial size disadvantageously increases.

Accordingly, it is an object of the invention to provide a rotary member engaging device, in which a rotary element of a planetary gear set is coupled with a stationary member through two paths formed of a frictionally engaging element and a one-way clutch, and more particularly, to provide a rotary member engaging device in which the pressure receiving area of a piston for operating the brake is sufficiently large and thus has sufficient torque capacity, without an increase in size.

SUMMARY OF THE INVENTION

The present invention provides an improved rotary element engaging device in an automatic transmission, including a stationary member, a planetary gear set having rotary elements, a frictionally engaging element interposed between the stationary member and one rotary element, a one-way clutch interposed between the stationary member and the one rotary element, and an operating member for engaging and disengaging the frictionally engaging element. The rotary element is engaged or disengaged with the stationary member through two paths formed of the frictionally engaging element and the one-way clutch, the oneway clutch being disposed between the frictionally engaging element and the operating member. The one-way clutch includes an inner race connected to the one rotary element and an outer race fixed to the stationary member, and the operating member is adapted to act on the frictionally engaging element through the outer race.

According to the above construction, the torque of the rotary element of the planetary gear is born by the stationary member through the inner race and the outer race. The engagement and disengagement of the frictionally engaging element is controlled by the operating member through the outer race.

In the present invention, therefore, the torque capacity can be increased without increasing the outer diameter of the operating member and without increasing the number of members forming the frictionally engaging element. Accordingly, the torque capacities per outer unit of diameter, axial size and weight can be increased in a simple construction without necessity of employing special structures such as double operating members and without increasing the weight as well as the axial and radial sizes. Thus, the present invention provides a reduction of the overall size and weight of the automatic transmission.

The foregoing and other objects, features, aspects and advantages of the present invention will become more apparent from the following detailed description of one embodiment of the present invention when taken in conjunction with the accompanying drawings.

DESCRIPTION OF THE PREFERRED EMBODIMENT

Figure 1:
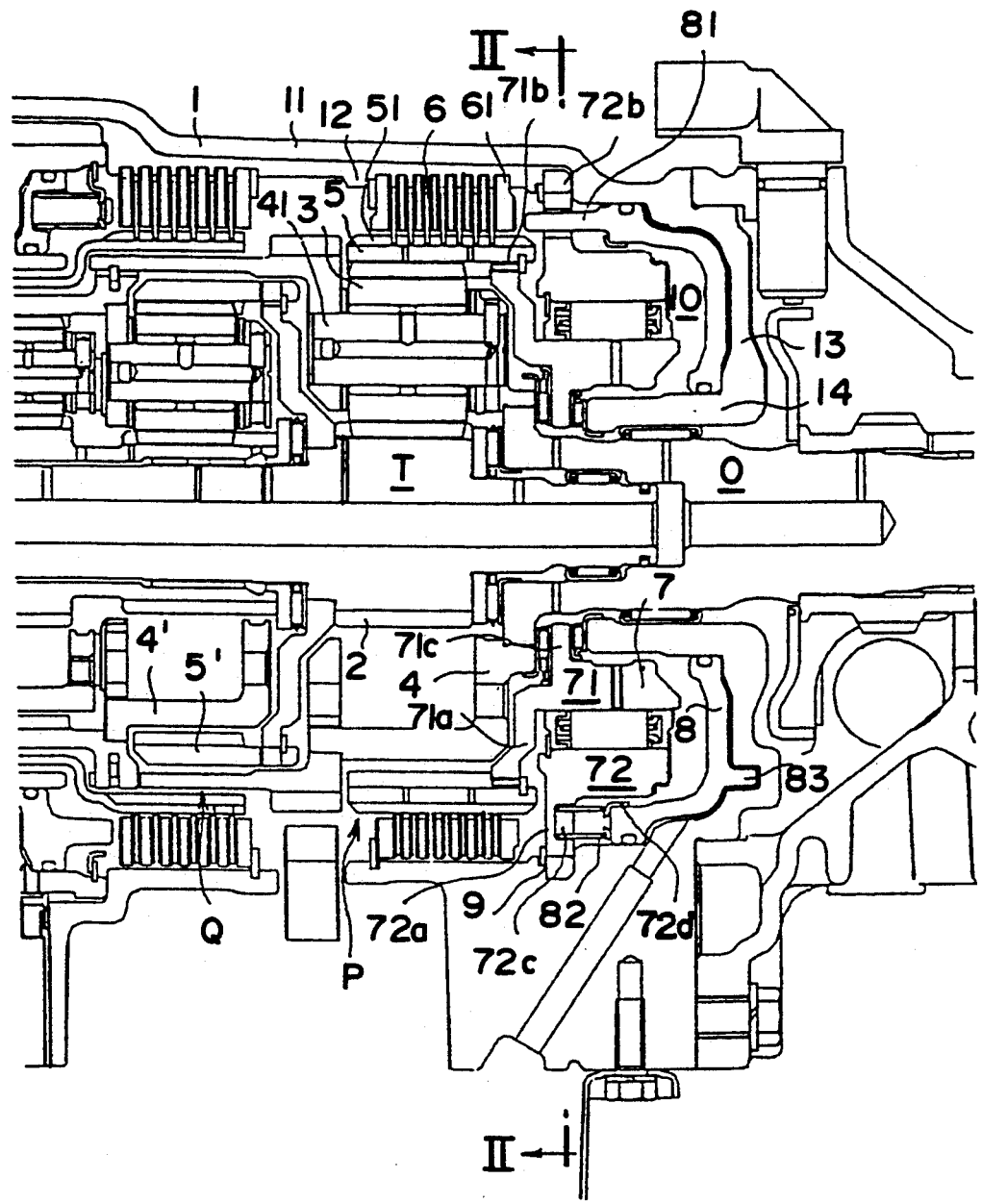
FIG. 1 is a cross-sectional view of one embodiment of the invention.
Figure 2:
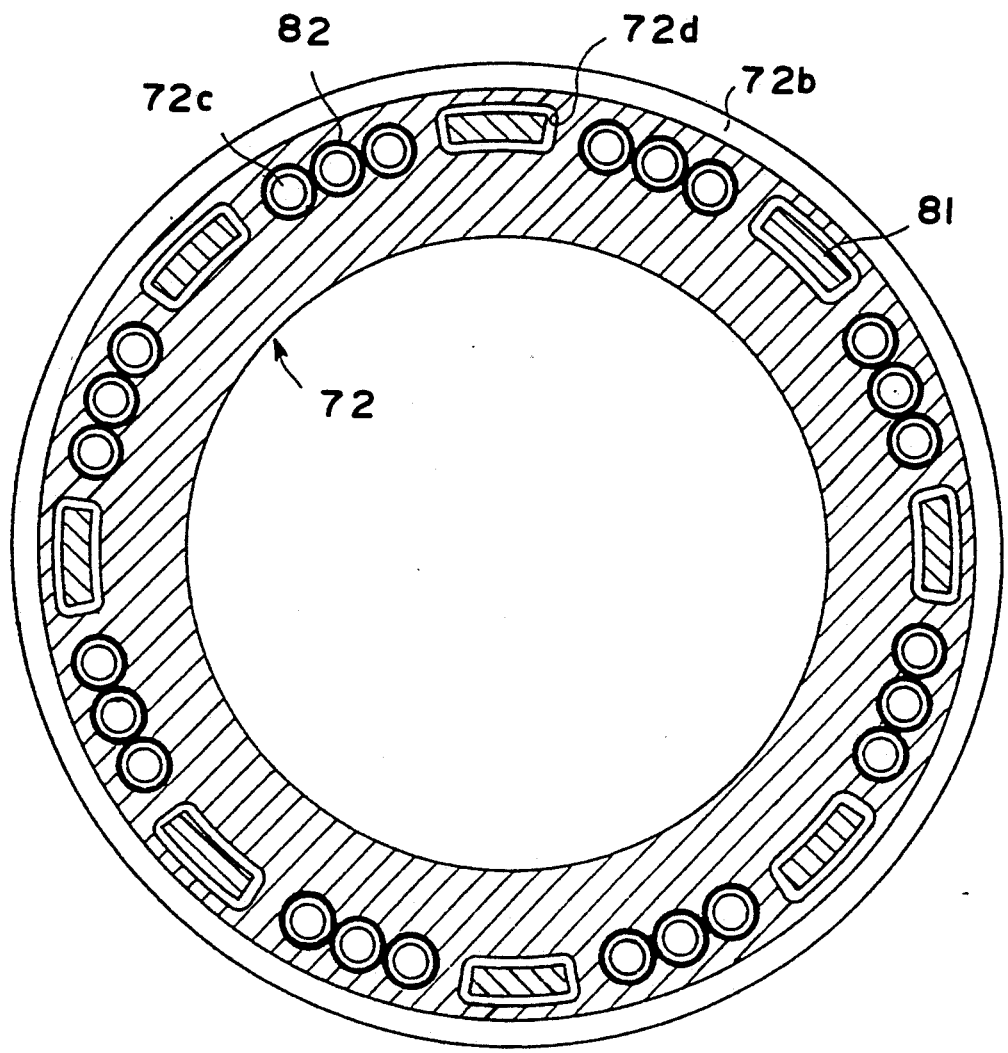
FIG. 2 is a cross-section taken along line II—II in FIG. 1.

Referring to FIGS. 1 and 2, a rotary element engaging device of an embodiment of the invention is applied to the rearmost brake for reverse driving in a five-speed automatic transmission. The five-speed automatic transmission includes a four-speed main transmission formed of three simply connected planetary gear trains and an over-drive transmission of a front disposition type (not shown) combined with the main transmission. The illustrated embodiment includes a stationary member, i.e. casing 1 and a planetary gear set P including rotary elements. The rotary elements include a sun gear 2, a pinion gear 3 meshing with the sun gear 2, a carrier 4 carrying the pinion gear 3, and a ring gear 5 meshing with the pinion gear 3. A frictionally engaging element 5 and a one-way clutch 7, are interposed between the casing 1 and the ring gear 5, i.e. one of the rotary elements. A piston 8 controls the engagement of the frictionally engaging element. Between the frictionally engaging element 6 and the piston 8, there is disposed the one-way clutch 7 which includes an inner race 71 connected to the ring gear 5 and an outer race 72 fixed to the casing 1. The piston 8 is adapted to act on the frictionally engaging element 6 through the outer race 72.

The casing 1 has a cylindrical outer peripheral wall 11, which is provided at its inner periphery with an axially extending spline 12, and a rear end wall 13, which is continuous with outer peripheral wall 11 and turns inwardly to form a cylindrical inner peripheral wall 14. The radially inward side of the inner peripheral wall 14 rotatably supports an output shaft 0 through a roller bearing. The outer peripheral wall 11, rear end wall 13 and inner peripheral wall 14 of the casing 1 define a cylindrical space in which the piston 8 axially slides.

In the planetary gear set P, the sun gear 2 is integral with a power transmitting shaft T, and the carrier 4 is integral with the output shaft 0. A pinion shaft 41 fixed to the carrier 4 rotatably supports the pinion gear 3 through a slide bearing. The ring gear 5 is provided at its outer periphery with a spline 51. The frictionally engaging element 6 is formed of a plurality of frictional members, which are alternatively engaged at their inner and outer peripheries with the spline 51 of the ring gear 5 and the spline 12 of the casing 1.

The inner race 71 of the one-way clutch 7 includes a flange 71a, which extends radially outward from a front end of the cylindrical main body of the inner race 71 and has a radially outermost portion inclined slightly forward. An axial spline 71b formed on the outer periphery of the flange 71a meshes with inner teeth of the ring gear 5 and is thus connected to the ring gear 5. The one-way clutch 7 also includes a flange 71c extending radially inward from a position slightly behind the front end of the cylindrical main body. The front and rear end surfaces of the flange 71c are in contact with roller bearings between the carrier 4 and the front end of the inner peripheral wall of the casing 1. The outer race 72 includes a flange 72a extending radially outward from a front end of its cylindrical main body. The flange 72a is provided at its outer periphery with a spline 72b engaging the spline 12 of the casing 1, and thus is prevented from rotating with respect to the casing 1.

As shown in FIG. 2, flange 72a of the outer race 72 is provided with a plurality of hole sets, each including three spring seat holes 72c, and a plurality of circumferentially extending arc-shaped apertures 72d, through which piston arms are inserted. The sets of holes 72c and the apertures 72d are alternately disposed and are circumferentially equally spaced from each other. A front end of the flange 72a of the outer race 72 is fixed axially by a snap ring 9. A rear end of the flange 72a is in contact with a stepped portion of the outer peripheral wall 11 of the casing 1 and thus is axially held by the wall 11. The space between the snap ring 9 and the stepped portion of wall 11 is slightly longer than the thickness of the outward flange 72a, so that a slight axial movement of the outer race 72 is allowed.

The piston head 8 has a L-shaped axial cross-section. The inner periphery of the piston 8 is sealingly and slidably supported by the inner peripheral wall 14 of the casing 1 through an O-ring. Similarly, the outer periphery of the piston 8 is sealingly and slidably supported through an O-ring by a portion of the outer peripheral wall 11 having a reduced diameter. Arms 81 extending forward are integrally formed with the piston head 8, and axially extend through piston arm inserting apertures 72d in the outer race 72. The distal ends of the arms 81 face the rearmost plate 61 of the frictionally engaging element 6. In order to prevent piston 8 from rotating and thereby interfering with the outer race 72, the piston 8 is provided with a stop 83 which engages the rear wall 13 of the casing 1 to prevent rotation relative thereto.

As can be seen in FIG. 1, major portions of the one-way clutch 7 are accommodated in the hollow interior of the piston head 8, and thus little space dedicated to the accommodation of the one-way clutch 7 is required. Return springs 82 for the piston 8 are coil springs, and have forward ends contacting the spring seat holes 72c and rear ends contacting the front end surface of the piston head 8 through washers 72d. Owing to the positional relationship between the return springs 82 and the snap ring 9, the return springs 82 elastically push the outer race 72 against the casing 1 to prevent rattling of the outer race 72, which may be caused by vibration, and thus prevent noise.

In reverse operation of the transmission, torque is input to a sun gear 2' of a planetary gear set Q located in front of the planetary gear set P. The piston 8 as it moves forward presses against the frictionally engaging element 6, so that the ring gear 5 of the planetary gear set P engages the casing 1. In this manner, both the planetary gear sets P and Q, of which ring gear 5' and sun gear 2 as well as carriers 4' and carrier 4 are directly coupled with each other, respectively, cooperate to transmit torque in the reverse direction through the carrier 4 to the output shaft 0. In the present invention, in contrast to the prior art, the inner race 71 of the one-way clutch 7 is connected to the ring gear 5, and the outer race 72 is connected to the casing 1, thus providing an improved arrangement for the one-way clutch 7. Therefore, fixing means such as bolts for fixing the inner race 71 to the cylinder is not required, and the thickness of the inner race 71 in the radial direction is reduced accordingly without any reduction in the area of the pressure receiving surface of the piston.

With the rotary element engaging device of the embodiment described above, the torque capacity of the reverse brake can be increased without increasing the outer diameter of the piston and without increasing the number of the friction members. Therefore, it is not necessary to increase the radial size or to employ a special structure such as double pistons. Accordingly, the pressure receiving areas of the piston per unit diameter and axial size can be advantageously increased, as compared with the prior art, with an uncomplicated structure.

Although the present invention has been illustrated by reference to the embodiment described above, i.e., a 5-speed automatic transmission in which the ring gear is the rotary member engaged by the rotary element engaging device of the invention, the invention is also widely and generally applicable to various other automatic transmissions. Also the rotary member operated upon may be the carrier or sun gear of a planetary gear set, and the transmission may employ various other input/output relationships. Further, the specific construction of individual components may be varied without departing from the spirit and scope of the invention as defined by the appended claims.

We claim:

1. A rotary element engaging device for an automatic transmission, comprising:
   a stationary member;
   a planetary gear set having a rotary element;
   a frictionally engaging element interposed between said stationary member and said rotary element;
   a one-way clutch interposed between said stationary member and said rotary element; and
   an operating member for engaging and disengaging said frictionally engaging element;
   said rotary element being selectively engaged with said stationary member through two paths defined by said frictionally engaging element and said one-way clutch;
   said one-way clutch being interposed between said frictionally engaging element and said operating member;
   said one-way clutch including an inner race connected to said rotary element and an outer race fixed to said stationary member; and
   said operating member acting on said frictionally engaging element through said outer race.

2. The rotary element engaging device of claim 1 wherein said outer race has a plurality of apertures and wherein said operating member is a piston having a circumferential skirt portion and a plurality of arms axially extending from said skirt portion and through said apertures for contact with said frictionally engaging element.

3. The rotary element engaging device of claim 1 wherein said frictionally engaging element is a multi-disk brake.

4. The rotary element engaging device of claim 2 wherein said frictionally engaging element is a multi-disk brake.

5. The rotary element engaging device of claim 3 wherein said rotary element is a ring gear of said planetary gear set.

6. The rotary element engaging device of claim 4 wherein said rotary element is a ring gear of said planetary gear set.

* * * * *

UNITED STATES PATENT AND TRADEMARK OFFICE
CERTIFICATE OF CORRECTION

PATENT NO. : 5,267,917
DATED : December 7, 1993
INVENTOR(S) : KADOTANI et al

It is certified that error appears in the above-indentified patent and that said Letters Patent is hereby corrected as shown below:

Title page, item
"[73] Assignees: Aisen Aw Co., Ltd." should read

--[73] Assignees: AISIN AW Co., Ltd.--.

Signed and Sealed this

Nineteenth Day of July, 1994

Attest:

BRUCE LEHMAN

Attesting Officer

Commissioner of Patents and Trademarks